US007444145B2

(12) United States Patent  
Diener

(10) Patent No.: US 7,444,145 B2  
(45) Date of Patent: *Oct. 28, 2008

(54) AUTOMATED REAL-TIME SITE SURVEY IN A SHARED FREQUENCY BAND ENVIRONMENT

(75) Inventor: Neil R. Diener, Rockville, MD (US)

(73) Assignee: Cisco Technology, Inc., San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/500,426

(22) Filed: Aug. 8, 2006

(65) Prior Publication Data

US 2006/0274684 A1 Dec. 7, 2006

Related U.S. Application Data

(63) Continuation of application No. 10/909,455, filed on Aug. 2, 2004, now Pat. No. 7,110,756.

(60) Provisional application No. 60/508,635, filed on Oct. 3, 2003, provisional application No. 60/556,513, filed on Mar. 25, 2004.

(51) Int. Cl.
   *H04Q 7/20* (2006.01)
(52) U.S. Cl. .................. 455/423; 455/63.1; 455/67.13; 455/424; 455/425; 455/456.1; 370/333; 370/338; 379/21; 379/32.01
(58) Field of Classification Search ......... 455/423–435, 455/456–457, 501, 63.1, 67.11, 67.13; 370/353, 370/338, 358; 379/21, 32.01
   See application file for complete search history.

(56) References Cited

U.S. PATENT DOCUMENTS 4,839,582 A 6/1989 Fukaya et al.

| 5,023,900 A | 6/1991 | Tayloe et al. |
| 5,093,927 A | 3/1992 | Shanley |

(Continued)

*Primary Examiner*—Stephen M D'Agosta  
(74) *Attorney, Agent, or Firm*—Edell, Shapiro & Finnan, LLC

(57) ABSTRACT

An intelligent spectrum management (ISM) system and method that includes sophisticated features to detect, classify, and locate sources of RF activity. The system comprises one or more radio sensor devices positioned at various locations in a region where activity in a shared radio frequency band is occurring. A server is coupled to the radio sensor devices and aggregates the data generated by the sensor devices. The server receives data from each of the plurality of sensor devices and executes functions to process the data. One feature of the system is to correlate data collected from the sensor or from suitably equipped devices that operate (and may move about) in a space with locations where provocation of that data occurs. To this end, radio frequency energy is received at each of a plurality of known positions (e.g., the sensors) in a space. The positions in the space of one or more devices emitting radio frequency energy in the space is determined from the received radio frequency energy at the plurality of known positions (e.g., the sensors). A variety of positioning techniques may be employed, such as received signal strength, time-difference-of arrival, time-of-arrival, etc. Activity data representing characteristics of received radio frequency energy in the space is generated at the sensors or at suitable equipped devices that may move about the space. The server correlates the activity data with the positions in the space that are associated with the provocation of the activity data.

19 Claims, 9 Drawing Sheets

U.S. PATENT DOCUMENTS

| | | | |
|---|---|---|---|
| 5,142,691 A | 8/1992 | Freeburg |
| 5,144,642 A | 9/1992 | Weinberg et al. |
| 5,276,908 A | 1/1994 | Koohgoli et al. |
| 5,355,522 A | 10/1994 | Demange |
| 5,375,123 A | 12/1994 | Andersson et al. |
| 5,398,276 A | 3/1995 | Lemke et al. |
| 5,428,819 A | 6/1995 | Wang et al. |
| 5,574,979 A | 11/1996 | West |
| 5,608,727 A | 3/1997 | Perreault et al. |
| 5,610,839 A | 3/1997 | Karolak et al. |
| 5,636,140 A | 6/1997 | Lee et al. |
| 5,655,217 A | 8/1997 | Lamson |
| 5,696,903 A | 12/1997 | Mahany |
| 5,732,077 A | 3/1998 | Whitehead |
| 5,745,777 A | 4/1998 | English et al. |
| 5,809,427 A | 9/1998 | Perreault et al. |
| 5,850,596 A | 12/1998 | Reynolds |
| 5,864,541 A | 1/1999 | Abu-Amara et al. |
| 5,889,772 A | 3/1999 | Fischer et al. |
| 5,907,812 A | 5/1999 | Van De Berg |
| 5,930,733 A | 7/1999 | Park et al. |
| 6,031,833 A | 2/2000 | Fickes et al. |
| 6,084,919 A | 7/2000 | Kleider et al. |
| 6,131,013 A | 10/2000 | Bergstrom et al. |
| 6,141,565 A | 10/2000 | Feuerstein et al. |
| 6,167,237 A | 12/2000 | Rapeli |
| 6,169,728 B1 | 1/2001 | Perreault et al. |
| 6,212,566 B1 | 4/2001 | Vanhoof et al. |
| 6,226,680 B1 | 5/2001 | Boucher et al. |
| 6,229,799 B1 | 5/2001 | Caillerie et al. |
| 6,229,998 B1 | 5/2001 | Hamdy et al. |
| 6,256,478 B1 | 7/2001 | Allen |
| 6,275,695 B1 | 8/2001 | Obhan |
| 6,295,461 B1 | 9/2001 | Palmer et al. |
| 6,307,839 B1 | 10/2001 | Gerszberg et al. |
| 6,317,599 B1 | 11/2001 | Rappaport et al. |
| 6,332,076 B1 | 12/2001 | Shah et al. |
| 6,349,198 B1 | 2/2002 | Carlson et al. |
| 6,351,643 B1 | 2/2002 | Haartsen |
| 6,366,780 B1 | 4/2002 | Obhan |
| 6,374,079 B1 | 4/2002 | Hsu |
| 6,374,082 B1 | 4/2002 | Carlson |
| 6,385,434 B1 | 5/2002 | Chuprun et al. |
| 6,418,131 B1 | 7/2002 | Snelling et al. |
| 6,442,384 B1 | 8/2002 | Shah et al. |
| 6,442,507 B1 | 8/2002 | Skidmore et al. |
| 6,499,006 B1 | 12/2002 | Rappaport et al. |
| 6,584,175 B1 | 6/2003 | Kibria et al. |
| 6,629,151 B1 | 9/2003 | Bahl |
| 6,674,403 B2 | 1/2004 | Gray et al. |
| 2001/0008837 A1 | 7/2001 | Takahashi |
| 2002/0006799 A1* | 1/2002 | Rappaport et al. .......... 455/446 |
| 2002/0019214 A1 | 2/2002 | Brown et al. |
| 2002/0077787 A1 | 6/2002 | Rappaport et al. |
| 2002/0085503 A1 | 7/2002 | Hulyalkar et al. |
| 2002/0086641 A1 | 7/2002 | Howard |
| 2002/0111772 A1 | 8/2002 | Skidmore et al. |
| 2002/0142744 A1 | 10/2002 | Okanoue et al. |
| 2002/0154614 A1 | 10/2002 | Jagger et al. |
| 2002/0155811 A1 | 10/2002 | Prismantas et al. |
| 2002/0177446 A1 | 11/2002 | Bugeja et al. |
| 2003/0021237 A1 | 1/2003 | Min et al. |
| 2003/0050012 A1 | 3/2003 | Black et al. |
| 2003/0050070 A1 | 3/2003 | Mashinsky et al. |
| 2003/0123420 A1* | 7/2003 | Sherlock .................... 370/338 |
| 2003/0198200 A1 | 10/2003 | Diener et al. |
| 2003/0198304 A1 | 10/2003 | Sugar et al. |
| 2003/0224741 A1 | 12/2003 | Sugar et al. |
| 2004/0023674 A1 | 2/2004 | Miller |
| 2004/0028003 A1 | 2/2004 | Diener et al. |
| 2004/0028123 A1 | 2/2004 | Sugar et al. |
| 2004/0137915 A1 | 7/2004 | Diener et al. |

* cited by examiner

AUTOMATED REAL-TIME SITE SURVEY IN A SHARED FREQUENCY BAND ENVIRONMENT

RELATED APPLICATION

This application is a continuation of U.S. application Ser. No. 10/909,455, filed Aug. 2, 2004, and entitled "Automated Real-Time Site Survey in a Shared Frequency Band Environment," now U.S. Pat. No. 7,110,756, which in turn claims priority to U.S. Provisional Application No. 60/508,635, filed Oct. 3, 2003 and to U.S. Provisional Application No. 60/556,513, filed Mar. 25, 2004. The entirety of each of the above-listed applications is incorporated herein by reference.

BACKGROUND OF THE INVENTION

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) will collapse. This phenomenon has already been observed in environments that have a high density of wireless devices.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. Thus, technology is needed to exploit all of the benefits of the unlicensed band without degrading the level of service that users expect.

Historically, the wireless industry's general approach to solving "tragedy of the commons" problems has been for manufacturers to simply move to another commons further up the spectrum. This solution, however, is not workable for much longer, due to spectrum scarcity and to the less attractive technical characteristics of the higher bands (decreased signal propagation and the inability to penetrate surfaces).

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on managing activity at the network level of the WLAN, but provide little or no capability to manage the frequency band where signals of multiple types (e.g., communication protocol/network types, device types, etc.) are present.

There are many shortcomings of existing WLAN system technologies. Current WLAN technologies are only generally aware of other network elements. They have no way to discover other nearby sources emitting RF signals in the unlicensed bands. The lack of device discovery and location functions exposes existing WLANs to significant security vulnerabilities. While current WLANs can perform standard authentication services and encryption services, they are vulnerable to imposter stations, denial-of-service attacks, parking lot attacks, and other security breaches.

SUMMARY OF THE INVENTION

Briefly, an intelligent spectrum management (ISM) system and method are provided that includes sophisticated features to detect, classify, and locate sources of RF activity. The system comprises one or more radio sensor devices positioned at various locations in a region where activity in a shared radio frequency band is occurring. A server is coupled to the radio sensor devices and aggregates the data generated by the sensor devices.

The server receives data from each of the plurality of sensor devices and executes functions to process the data. For example, the server executes a performance function that monitors and generates events related to the performance of the wireless network, a discovery function that monitors and generates events pertaining to devices operating in the wireless network or other radio frequency emitters in the frequency band and a security function that monitors and generates events related to security threats to the wireless network. In addition, the server interfaces data generated by its various functions to a client application, e.g., a network management application.

One feature of the system is an automatic site survey feature in which data collected from one or more sensors or from suitably equipped devices that operate (and may move about) in a space is correlated with location data associated with the activity that led to generation of that activity data. To this end, radio frequency energy is received at each of a plurality of known positions (e.g., the sensors) in a space. The positions in the space of one or more devices emitting radio frequency energy in the space is determined from the received radio frequency energy at the plurality of known positions (e.g., the sensors). A variety of positioning techniques may be employed, such as received signal strength, time-difference-of arrival, time-of-arrival, etc. Activity data representing characteristics of received radio frequency energy in the space is generated at the sensors or at suitable equipped devices that may move about the space. The server correlates the activity data with the positions in the space that are associated with the provocation of the activity data. The correlated data may be displayed on a map that represents the physical space that is being monitored.

DETAILED DESCRIPTION OF THE DRAWINGS

The system, methods, software and other technologies described herein are designed to cooperatively manage use of a shared frequency band where signals of multiple types occur (often simultaneously), such as an unlicensed band, and interference among the users of the band may occur. Many of the concepts described herein may apply to frequency bands that are not necessarily "unlicensed," such as when a licensed frequency band is used for secondary licensed or unlicensed purposes.

The term "network" is used hereinafter in many ways. There may be one or more wireless networks each comprising multiple devices or nodes that operate in the shared frequency band. One example of such a network is a WLAN. There are also networks, called piconets, which are formed with Bluetooth™ capable devices. Many of the examples described herein are made with respect to an IEEE 802.11 (also known as WiFi™) WLAN, mostly due in part to the expansive use that the WLAN has seen, and is expected to continue to see. In addition, the term network is referred to a wired network, and to an aggregation of one or more wired and wireless networks. The spectrum management systems, methods, software and device features described herein new are not limited to any particular wireless network, and are equally applicable to any wireless network technologies now known or hereinafter developed for use in a shared frequency band.

Figure 1:
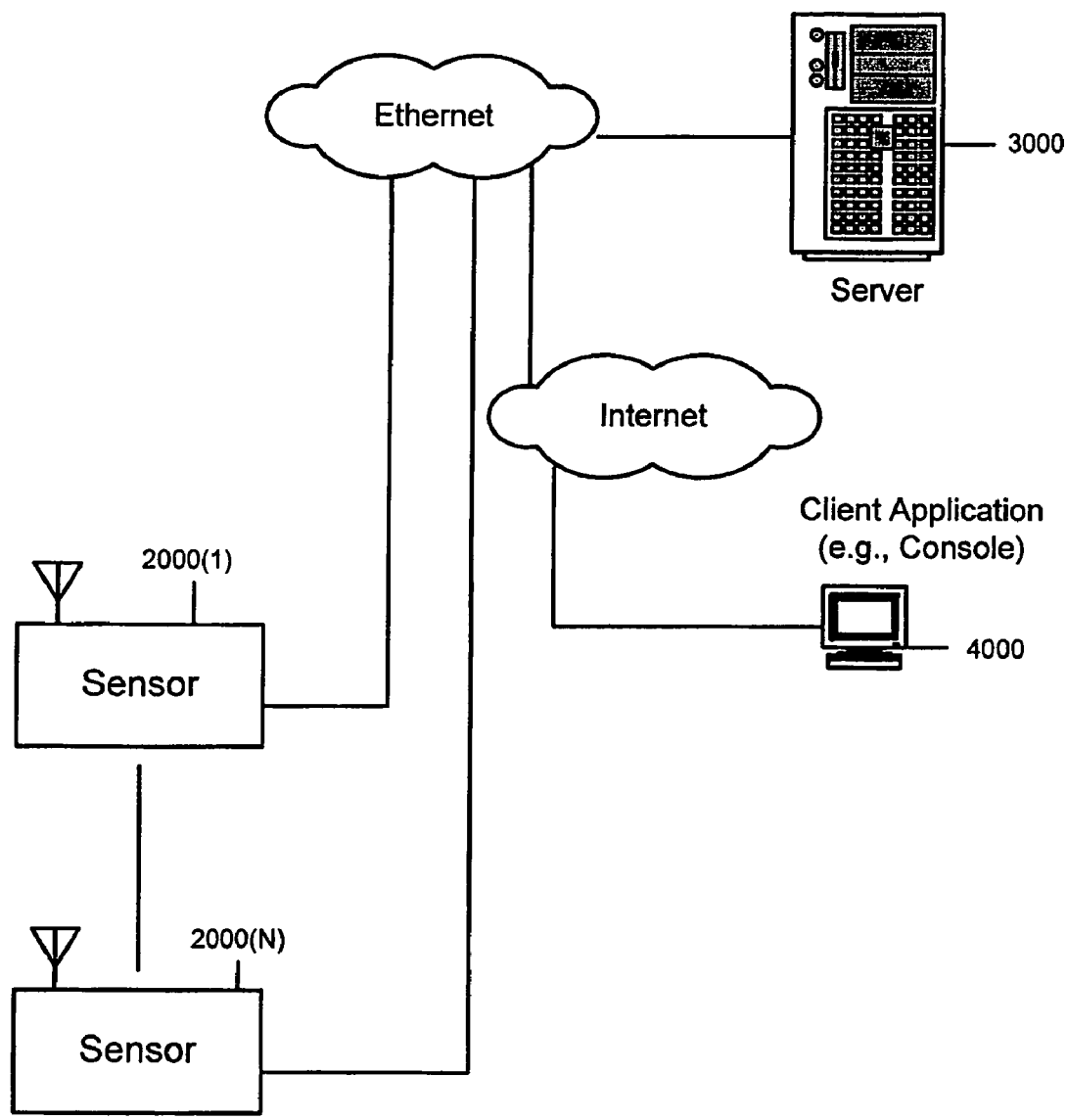
FIG. 1 is a block diagram of a radio sensor device and server system.

Referring first to FIG. 1, a high level diagram of the client-server-sensor system is shown. The sensors 2000(1) to 2000(N) connect to the server 3000 via a local area network, e.g., Ethernet. The client application 4000, e.g., a console graphical user interface (GUI) application, connects to the server via the Ethernet and/or Internet. The interface between the sensors 2000 and the server 3000 is referred to as a network spectrum interface NSI.

The server 3000 may run on a dedicated server box, or it may be integrated with other servers such as WLAN switches, authentication servers or management servers. The server 300 consists of an application (or applications) that implements several services or functions described hereinafter. The server 3000 interfaces with the client applications 4000 by an application programming interface (API) called the intelligent spectrum management interface (ISMI).

The server manages all of the sensors it communicates with. It aggregates data from the sensors, performs analysis on the data and presents the data in formats amenable to other network management entities. The server software analyzes the raw data on at least three axes:

Discovery: Determine the complete set of spectrum emitting devices (e.g., 802.11 wireless network APs and STAs, and other non-802.11 compliant emitters) that are present and track their physical location of devices.

Performance: Analyze the spectrum, protocol, and location data in order to detect and mitigate performance problems. Examples include network load problems, frequency retransmissions, interference and cold spots. Process streams of RF and related air quality data.

Security: Analyze the spectrum, protocol, and location data in order to detect and mitigate security issues. Examples include rogue APs, ad hoc networks, perimeter breaches, denial of service attacks (protocol and RF level) and movement of otherwise designated stationary assets.

The Sensor

Figure 2:
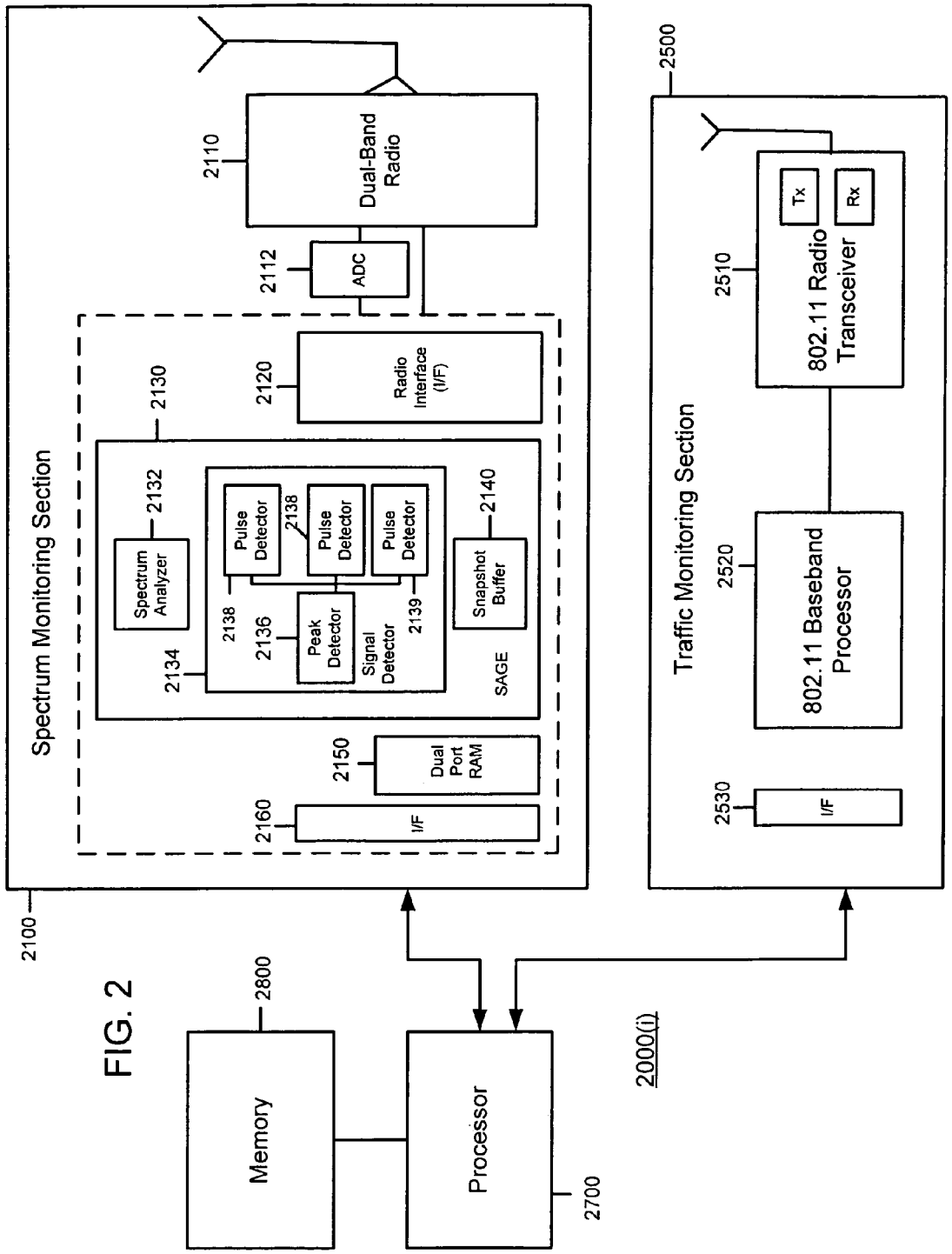
FIG. 2 is a block diagram of a radio sensor device.

Turning now to FIG. 2, each sensor 2000(i) comprises a spectrum monitoring 2100 section to monitor RF activity in the frequency band and a traffic monitoring section 2500 that is capable of sending and receiving traffic according to a communication protocol, such as an IEEE 802.11 WLAN protocol. The spectrum monitoring section 2100 comprises a radio 2110 (primarily for receive operations) that is capable of tuning to receive energy at each channel (or simultaneously all channels in a wideband mode) of, for example, any of the unlicensed bands (2.4 GHz and 5 GHz) in which IEEE 802.11 WLANs operate. An analog-to-digital converter (ADC) 2112 is coupled to the radio 2100 that converts the downconverted signals from the radio 2100 to digital signals. A radio interface (I/F) 2120 is coupled directly to the radio 2100 and also to the output of the ADC 2112. A real-time spectrum analysis engine (SAGE) 2130 is coupled to the radio I/F 2120. The SAGE 2130 includes a spectrum analyzer 2132, a signal detector 2134 consisting of a peak detector 2136 and one or more pulse detectors 2138 and 2139, and a snapshot buffer 2140. A Fast Fourier Transform (FFT) block (not shown) is coupled between the I/F 2120 and the spectrum analyzer 2132, or included in the spectrum analyzer 2132. The SAGE 2130 generates spectrum activity information that is used in the sensor and the server to determine the types of signals occurring in the frequency band, and captures signals for location measurement operations. A dual port random access memory (RAM) 2150 is coupled to receive the output of the SAGE 2130 and a processor I/F 2160 interfaces data output by the SAGE 2130 to a processor 2700, and couples configuration information from the processor 2700 to the SAGE 2130.

The functions of the SAGE 2130 will be briefly described in further detail hereinafter, but more details on the SAGE can be found in commonly assigned U.S. Pat. No. 6,714,605, commonly assigned co-pending U.S. application Ser. No. 10/420,511, filed Apr. 22, 2003, entitled "System and Method for Real-Time Spectrum Analysis in a Radio Device," and commonly assigned co-pending U.S. Provisional Patent Application No. 60/587,834, filed Jul. 14, 2004, entitled "Pulse Detection Scheme for Use in Real-Time Spectrum Analysis." The spectrum analyzer 2132 generates data representing a real-time spectrogram of a bandwidth of radio frequency (RF) spectrum, such as, for example, up to 100 MHz. The spectrum analyzer 2132 may be used to monitor all activity in a frequency band, for example, the 2.4-2.483 GHz ISM band, or the 5.15-5.35 GHz and 5.725-5.825 GHz UNII bands. The FFT block referred to above is, for example, a 256 frequency bin FFT block that provides (I and Q) FFT data for each of 256 frequency bins that span the bandwidth of frequency band of interest. An FFT block with greater resolution or bandwidth may be used as well. A spectrum correction block may be included to correct for I and Q channel imbalance by estimating an I-Q channel imbalance parameter related to phase error and amplitude offset between the I and Q channels, and to suppress a side tone resulting from the RF downconversion process. The spectrum analyzer 2132 may further comprise a power computation block that computes (FFTdataI)2 and (FFTdataQ)2, respectively, and adds them together, to output a power value for each FFT frequency bin. The spectrum analyzer 2132 may further include a stats logic block that has logic to accumulate statistics for average power, duty cycle, maximum power and a peaks histogram. Statistics are accumulated in the dual-port RAM over successive FFT time intervals. After a certain number of FFT intervals, determined by a configurable value stored in the spectrum analyzer control registers, an interrupt is generated to output the stats from the dual-port RAM. For example, the stats are maintained in the dual-port RAM 2150 for 10,000 FFT intervals before the processor reads out the values. The power versus frequency data generated by the spectrum analyzer 2132 is also used as input to the signal detector.

The signal detector 2134 detects signal pulses in the frequency band and outputs pulse event information entries, which include one or more of the start time, duration, power, center frequency and bandwidth of each pulse that satisfies configurable pulse characteristic criteria associated with a corresponding pulse detector.

In the signal detector 2134, the peak detector 2136 looks for spectral peaks in the (power versus frequency data derived from FFT block output), and reports the bandwidth, center frequency and power for each detected peak. The output of the peak detector 2136 is one or more peaks and related information. The pulse detectors 2138 detect and characterize signal pulses based on input from the peak detector 2136. A pulse detector lite 2139 may be employed to generate pulse events in a manner slightly different from pulse detectors 2138, as described in the aforementioned co-pending application entitled "Pulse Detection Scheme for Use in Real-Time Spectrum Analysis" filed on Jul. 14, 2004.

The snapshot buffer 2140 collects a set of raw digital signal samples useful for signal classification and other purposes, such as location measurements. The snapshot buffer 2140 can be triggered to begin sample collection from either the signal detector 2134 or from an external trigger source, such as a signal from the processor to capture received signal data for a period of time sufficient to include a series of signal exchanges used for location processing explained hereinafter. Alternatively, the snapshot buffer will be in a free-running state continuously storing captured and then in response to detecting the first signal (e.g., the Probe Request frame), the snapshot buffer is put into a post-store mode that extends long enough to capture the ACK frame signal data.

The traffic monitoring section 2500 monitors packet activity in a wireless network, e.g., a WLAN, and sends and receives certain packets that are used for location measurement processes. For example, as described hereinafter, a sensor may transmit an 802.11 Probe Request frame, data frame or request-to-send frame that may be addressed to the device to be located. Included in the traffic monitoring section 2500 are a radio transceiver 2510 (comprising a transmitter Tx and a receiver Rx) and a baseband signal processor 2520. The radio transceiver 2510 and baseband signal processor 2520 may be part of a package chipset available on the market today, such as an 802.11 WLAN chipset for any one or more of the 802.11a/b/g or other WLAN communication standards. The baseband signal processor 2520 is capable of performing the baseband modulation, demodulation and other PHY layer functions compliant with the one or more communication standards of interest (e.g., IEEE 802.11a,b,g,h, etc.). An I/F 2530 couples the baseband signal processor 2520 and radio transceiver 2510 to the processor 2700.

There may be other traffic monitoring sections in the sensor to monitor communication protocol type activity of other types, such as Bluetooth™ communications.

The processor 2700 performs the various processing algorithms described herein on the output of the SAGE 2130 and on received packets from the traffic monitoring section 2500. The processor I/F 2160 of the spectrum monitoring section 2100 and the processor I/F 2530 of traffic monitoring section 2500 may be a Mini-PCI or PC-Card (e.g., Cardbus™) interface, or any other interface known in the art. While not shown in FIG. 2, there is also an LAN interface block (e.g., Ethernet) that is coupled to the processor 2700 to enable the sensor to communicate with the server with a wired LAN connection. The processor 2700 may generate signals to control the radio 2110 independently of the radio transceiver 2510, such that spectrum monitoring is occurring on one channel while protocol monitoring is simultaneously occurring on another channel, for example.

It is envisioned that a WLAN AP may include all of the functionality of a sensor described above, and may be switched between AP operating mode and a sensor operating mode.

Figure 3:
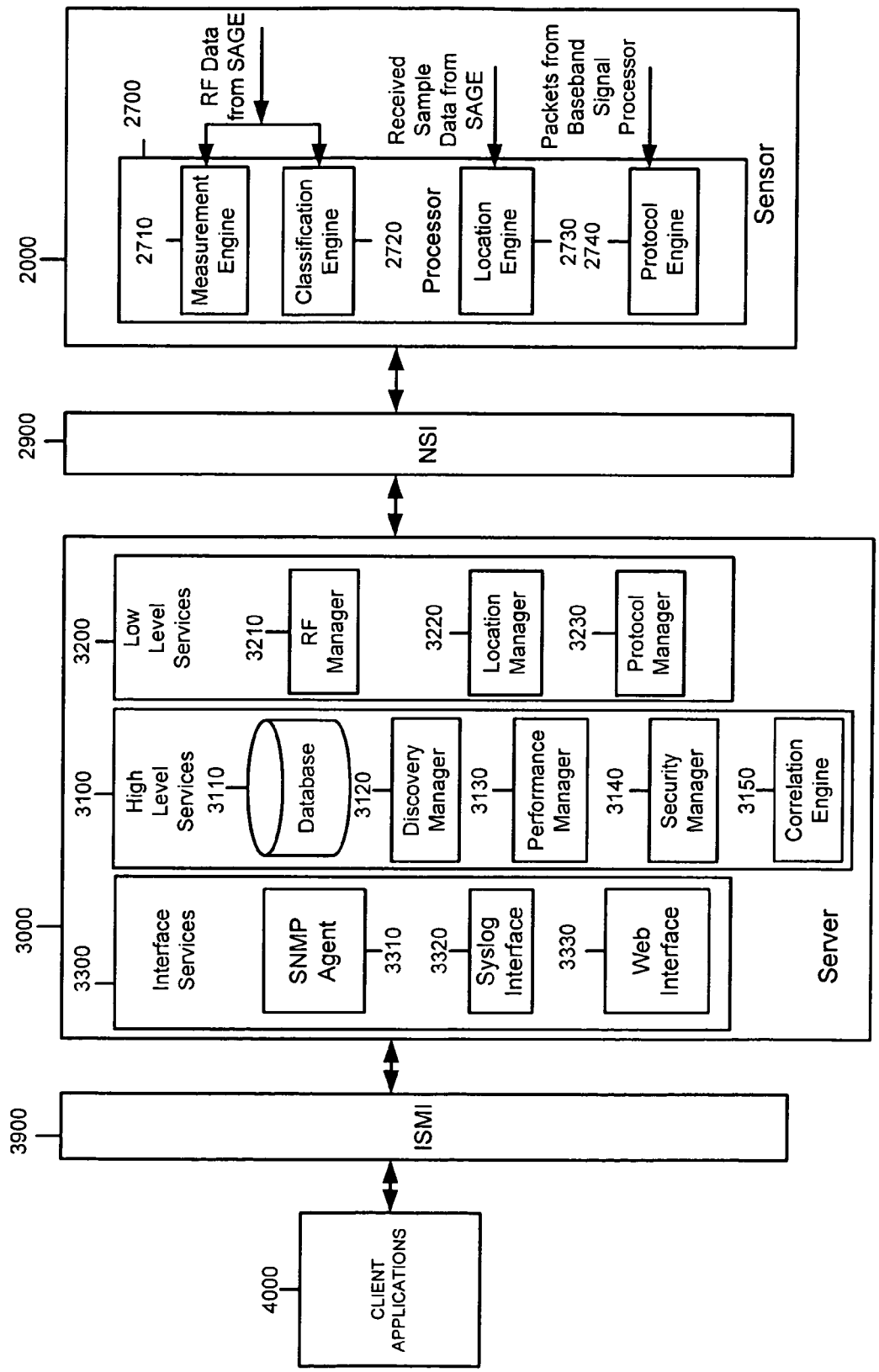
FIG. 3 is a functional block diagram of the radio sensor device and server.

Turning to FIG. 3, a high level diagram is shown of the major functional blocks in the sensor 2000 and server 3000, as well as the interfaces between the sensor 2000 and server 3000, and between client applications 4000 and the server 3000. In the sensor 2000, there are functions performed by the processor (executing one or more software programs) including a measurement engine 2710, a classification engine 2720, a location engine 2730 and a protocol engine 2740. The measurement engine 2710 and classification engine 2720 operate on RF data from the SAGE 2130. The location engine 2730 operates on raw received signal data obtained by the SAGE 2130 and the protocol engine 2740 operates on packet data generated by the baseband signal processor 2520.

The interface between the sensor 2000 and the server 3000 is referred to as a network spectrum interface (NSI) 2900.

The server 3000 may run on a dedicated server box, or it may be integrated with other servers such as WLAN switches, authentication servers or management servers. There are high level services 3100, low level services 3200, and interface services 3300. The high level services 3100 include a database 3110, discovery manager 3120, performance manager 3130 and security manager 3140. The low level services 3200 are invoked by one or more or the high level services 3100 and include an RF manager 3210, location manager 3220 and protocol manager 3230. The interface services 3300 include an SNMP agent 3310, a Syslog interface 3320 and a web interface 3300. The server 3000 interfaces with the client applications 4000 by an application programming interface (API) called the intelligent spectrum management interface (ISMI) 3900.

The functions provided by the server 3000 can be summarized as follows. The server manages all of the sensors it communicates with. It aggregates data from the sensors, performs analysis on the data and presents the data in formats amenable to other network management entities The software functions of the sensor 2000 will be described in more detail.

The measurement engine 2710 software in the sensor is responsible for communicating with the SAGE driver software to configure the SAGE 2130 in the sensor 2000. In addition, the measurement engine 2710 manages the resources of the SAGE 2130 between spectrum monitoring functions and device location functions. The measurement engine 2710 also collects and aggregates data from the SAGE 2130 into meaningful units. The functions of the measurement engine 2710 and classification engine 2720 may be incorporated into a single functional block. Furthermore, the measurement engine 2710 may configure reporting of data and statistics generated by the SAGE 2130 and adjust the frequency channel (and/or scan rate) on which the SAGE 2130 operates. The measurement engine 2710 may also operate the radio receiver in the sensor in a wideband mode to simultaneously process data across an entire unlicensed frequency band of interest. The measurement engine 2710 produces the spectrum activity data from raw spectrum analysis and snapshot buffer data output by the SAGE 2130. The spectrum activity data, simply put, comprises data represents one or more of time, frequency and power of radio frequency energy received in a portion (or all) of a frequency band.

One function of the measurement engine 2710 is to control which bands are monitored, and to produce streams from spectrum analyzer statistics (SA STAT) and pulses produced by the SAGE. A SA STAT stream consists of one or more of: maximum power, average power, and average duty cycle.

A pulse stream reports on individual pulses that have been detected by the sensor.

A pulse histogram stream provides histogram data on attributes of pulses detected by the sensor, including histograms for center frequency, bandwidth, duration, inter-pulse (gap, e.g., start to start), and power.

In addition, the measurement engine 2710 produces air quality (AQ) metrics that measure different attributes of a given "channel". The channels can be any requested range of frequencies, and might include an entire band if so desired. There are also protocol related AQ metrics derived by the server from the protocol monitoring records produced by the protocol engine in a sensor.

Although many of the previously described measurements can be decimated over longer time intervals to reduce network bandwidth, the AQ metrics are intended for longer statistical measures and would normally be enabled for intervals in the range of once a minute, as an example.

The following is the exemplary list of spectrum AQ metrics.

Maximum Power: Derived from the SA STATs, this is the maximum power measurement in any bin for the channel.

Average Power: Derived from the SA STATs, this is the average of average power measurement across all bins for the channel.

Duty Cycle: For all pulses that overlap the channel, it is the measure of the time that 1 or more pulses are present divided by the time spent monitoring this channel (normalized for overlap of dwell with channel). A configurable IFS setting can be used to approximate impact on CSMA-CA protocols, such as 802.11. This extends the pulse durations for a configured additional back off time, before treating the channel as inactive.

Pulses Per Second: For all pulses that overlap the channel, this is the total number of pulses divided by the time spent monitoring this channel (normalized for overlap of dwell with channel).

Average Pulse Duration: For all pulses that overlap the channel, this is the average of the pulse durations.

An AQ stream request can specify up to 32 frequency ranges to take measurements over, an IFS value (described for duty cycle), and a bitmap of requested metrics.

To summarize, each sensor's AQ measurements will consist of the following statistics for each configured frequency range (over a period of time longer than that provided by the SA STATs):

SAGE-based:
Power measurements (max, average)
Duty cycle
Pulses per second
Average pulse duration 802.11-based:
Percentage of 802.11 retries (packet resends)
Average 802.11 data rate
Number of 802.11 client stations (STAs) detected Sensors will send a continual background air quality statistic stream to the server to be stored in the database. In the case of the protocol portion of the air quality statistics, the server computes the noted statistics from the packet analysis data produced by the protocol engine 2740 in the sensor. The use and analysis of the air quality data is described further hereinafter.

The classification engine 2720 classifies/identifies signals occurring in the frequency based on the output of the SAGE 2130. Examples of signals that the classification engine 2720 may identify include Bluetooth™ signals, microwave oven signals, cordless telephones, wireless headsets, radar, etc. Techniques for signal classification are described in greater detail in U.S. patent application Ser. No. 10/246,364, filed Sep. 18, 2002, entitled "System and Method for Signal Classification of Signals in a Frequency Band"; U.S. patent application Ser. No. 10/420,362, filed Apr. 22, 2003, entitled "System and Method for Classifying Signals Occurring in a Frequency Band"; and U.S. patent application Ser. No. 10/628,603, filed Jul. 28, 2003, entitled "System and Method for Classifying Signals Using Timing Templates, Power Templates and Other Techniques." The classification engine 2720 may generate events (at a configurable update rate) associated with identified signals and may further make a generalized air quality analysis of the frequency band given the type of signals determined to be occurring in the frequency band.

There are several types of classification events that indicate why a message has been sent. These types include the following.

Up: A device has been detected, and has met some minimal confidence level. The measurements include all pulses received until the record is generated.

Down: A device is no longer detectable. This may result because the device has stopped transmitting, that its transmissions are below the sensor's detection sensitivity that the template has been unloaded, or that monitoring of the band has been cancelled. The measurements include all pulses since the last event record for this instance, and under some cases there may have been no pulses since the last record.

Periodic Update: Since an instance may persist for an extended period of time and the measurements may vary over that interval, the SMC can be directed to produce periodic measurement records. The measurements include all pulses since the last event record for this instance.

The following fields may be present in a classification event record.

Timestamp: This provides a reference timestamp for the event.

Instance ID: This is a unique ID assigned to each new instance as it is classified. It can be used to match Update and Down events with the matching Up event.

Template ID: This identifies the template used to classify the device. This implies the name, version, and framework ID to the server.

Event Type: This is one of the event types, listed above.

Confidence Level: This is a number from 0 to 100, used to indicate confidence of the classification.

Average Power: This is the average energy measured across all pulses measured in this record.

Examples of the statistics and events output by the measurement engine 2710 and classification engine 2720 are described hereinafter.

The location engine 2730 in the sensor is responsible for capturing received signal data that is used to compute the location of devices operating in a space in which the sensors are positioned. Many location or position techniques are known in the art, such as time of arrival (TOA), time difference of arrival (TDOA), power of arrival (POA) or received signal strength (RSS) data. The location engine 2730 makes measurements on received signals (from the device to be located and perhaps from another sensor device) and sends those computations to the server 3000 where the location computation is made. For example, the location engine 2730 may be employed to process data based on received signals from 802.11 devices (clients or APs) in order to locate their positions, as well as other non-802.11 devices operating in the relevant frequency band(s) and which would potentially interfere with 802.11 communication protocol activity. In so doing, the location engine 2730 negotiates access to the snapshot buffer of the SAGE (to capture raw received signal data) by sending a request to the measurement engine 2710.

The protocol engine 2740 captures data pertaining to packets transmitted over the air in accordance with a communication protocol, such as the IEEE 802.11 protocols. This data is referred to as protocol activity data, and is useful to indicate the performance of communication occurring according to the communication protocol The baseband signal processor section of the sensor 2000 may operate in a "promiscuous mode" by which it can receive packets sent by any device on a particular 802.11 channel (but may not have access to the content of packets). In this manner, the sensor can develop statistics about the type of packets being sent, the volume of packet traffic, packet retransmissions, intruding APs or STAs, etc. Upon receiving a packet, the protocol engine 2740 collects statistics on the packet on a per channel, per device or per BSSID basis. Then, it applies a configurable (user-defined) filter to the packet for purposes of generating statistics. If the filter passes the packet it is sent to the server for further processing, otherwise it is bit bucketed. For example, the filter may be configurable with a Boolean expression of packet characteristics. Examples of the statistics and events output by the protocol engine 2740 are described hereinafter. The protocol engine 2740 is responsive to a service configuration (Config) message from the server to configure how to capture and report protocol information. In addition, the protocol engine 2740 performs functions to support location determination of other devices, such as scheduling the transmission of a reference packet that is used in TDOA location computations.

The protocol engine 2740 configures the process by which the sensor scans 802.11 channels to obtain packet information. The channel scan parameters may include channel selection, dwell time on the channel, hop pattern between channels, measurement intervals, etc.

Finally, the protocol engine 2740 configures criteria for protocol-based asynchronous alerts associated with network performance or security, or sensor operational conditions according to corresponding threshold based alarm criteria. Examples of techniques useful for protocol-based intrusion detection and address spoofing are described in the paper entitled "Layer 2 Analysis of WLAN Discovery Applications for Intrusion Detection," Joshua Wright, Nov. 18, 2002, and in the paper entitled "Detecting Wireless LAN MAC Address Spoofing," Joshua Wright, Jan. 21, 2003. These papers are available from the Internet using a suitable search engine, and their entirety is incorporated herein by reference.

The capabilities of the sensor 2000 shown in FIGS. 2 and 3 may be incorporated into a client device, such as an 802.11 WLAN client device that may be mobile device in the sense that it may move about a space. For example, the client device may be a laptop computer, wireless voice-over-IP phone, etc. The term "client" is to denote a device that is a "client" with respect to a WLAN AP. Other terms for this type of device may be a remote device (unit or station) or mobile device, whereas an AP may also be called a base device, unit or station. In this case, the traffic monitoring section 2500 would handle all 802.11 communications, and the spectrum monitoring section 2100 would handle the real-time spectrum analysis, together with the processor 2700 which would handle the software functions described above for measurement, classification, location, etc. Alternatively, the spectrum monitoring section 2100 and traffic section 2500 may share the same 802.11 radio. A client station so equipped can generate spectrum measurement data (signal classification, pulse events, pulse histograms, stream spectrum analysis statistics, and air quality statistics) based on the RF environment it experiences as it moves about. There are advantages to such an enabled client station, one of which is described below in conjunction with FIG. 5. Similarly, these capabilities may be incorporated in a WLAN access point (AP) device.

The Server

Again, with reference to FIG. 3, the high level services 3100 of the server 3000 will now be described.

The database 3110 provides physical storage of spectrum information, events, protocol information and related information generated by the sensors. In addition, the database 3110 maintains configuration information pertaining to the functions in the server 3000 and many functions in the sensors. A database schema is defined for the storage of this information, and is described hereinafter.

Discovery

The discovery manager 3120 in the server processes data pertaining to the discovery of new devices operating in the frequency band, such as 802.11 and other devices, and the physical location of those devices. Discovery involves handling reports from sensors concerning the up (and new) and down state of such devices. Also, multiple sensors may see the same 802.11 device coming up. The discovery manager 3120 detects and suppresses the duplicate event. A discovery event associated with an 802.11 device may fall into one of the following classes: ours, known others, new and rogue. To this end, the discovery manager 3120 may maintain a list of authorized APs and STAs so that when a new device is detected by a sensor, the discovery manager 3120 can determine whether or not it is authorized. Alternatively, the security manager, described hereinafter, could be the software process that maintains the list of authorized devices and determines the status of newly discovered devices.

Similarly, the discovery manager 3120 also processes data pertaining to known and unknown interferers and handles associated events including up, down, new, and duplicate suppression. The sensors report on new known and unknown interferer devices. Also, multiple sensors may see the same known and unknown interferer device coming up and the discovery manager suppresses the duplicate event.

The discovery manager 3120 executes a scan policy. When a new device is discovered and is in the management domain of the server, a request is made to the location manager 3220 to determine the location of the device.

Finally, the discovery manager 3120 handles event-action association. Given an event (e.g., when a new AP comes up), the discovery manager 3120 initiates one or a series of actions (i.e., check whether the server should manage that device, and if so, locate it, etc.).

Performance

The performance manager 3130 manages performance issues concerning the operation of wireless networks under the domain of the server in the shared frequency band. One such function is based on the air quality analysis by which the performance manager 3130 generates an air quality analysis that may indicate to the user overall network and spectrum air quality.

The performance manager 3130 also sets a variety of thresholds which, if crossed, generates alarms. For example, an alarm may be generated if an AP has too many associated STAs, etc.

Security

The security manager 3140 in the server is responsible for managing security of one or more wireless networks operating in the frequency band under its domain. One type of security function is rogue AP detection. In rogue AP detection, a user can specify which APs are inside a security perimeter of the server and are authorized to operate in that security perimeter based on IP or MAC address. Sensors report the APs and STAs that they detect. The security manager 3140 processes these reports and determines whether an AP that is not authorized to operate inside the security perimeter has been detected. If so, then the security manager 3140 generates an alarm indicating the presence of a rogue AP. A sensor detects the presence of an AP. The security manager 3140 has the responsibility to declare the detected AP a rogue.

A client application (user) can specify the parameters of the security perimeter. The security manager 3140 configures the security perimeter accordingly, which may be a polygon or volume region specified by the user. Inside this perimeter are the devices that the user wants to protect. The security manager 3140 may generate an alert when a device physically located outside the security perimeter accesses a WLAN that is located inside the security perimeter. Conversely, the security manager 3140 may generate an alert when a device physically located inside the security perimeter accesses or sends data to a device outside the security perimeter or associates with an AP outside the security perimeter. Moreover, a client user can give a particular device operating within the domain of the server a "fixed location attribute." The security manager 3140 detects whenever that "fixed location" device moves and reports it or generates an alert.

The security manager 3140 may also use trend information to detect "suspicious" protocol usage. A sequence of packets that meets certain filter characteristics might be deemed to be suspicious. For example, suspicious activity may be alerted when a sensor detects repeated attempts to associate with an AP using different MAC addresses. Alternatively, something more subtle that may be deemed suspicious is if a sensor detects packets from a particular STA that have non-sequential sequence numbers, potentially suggesting that a device user is masquerading as a particular STA. Another example is a probe packet that matches a signature of a well-known piece of hacker software such as NetStumbler. These types of activities need to be monitored at the sensor, since it requires examination of detailed packet traces. The security manager 3140 responds to suspicious protocol activity reports sent by sensors.

Correlation

Figure 4:
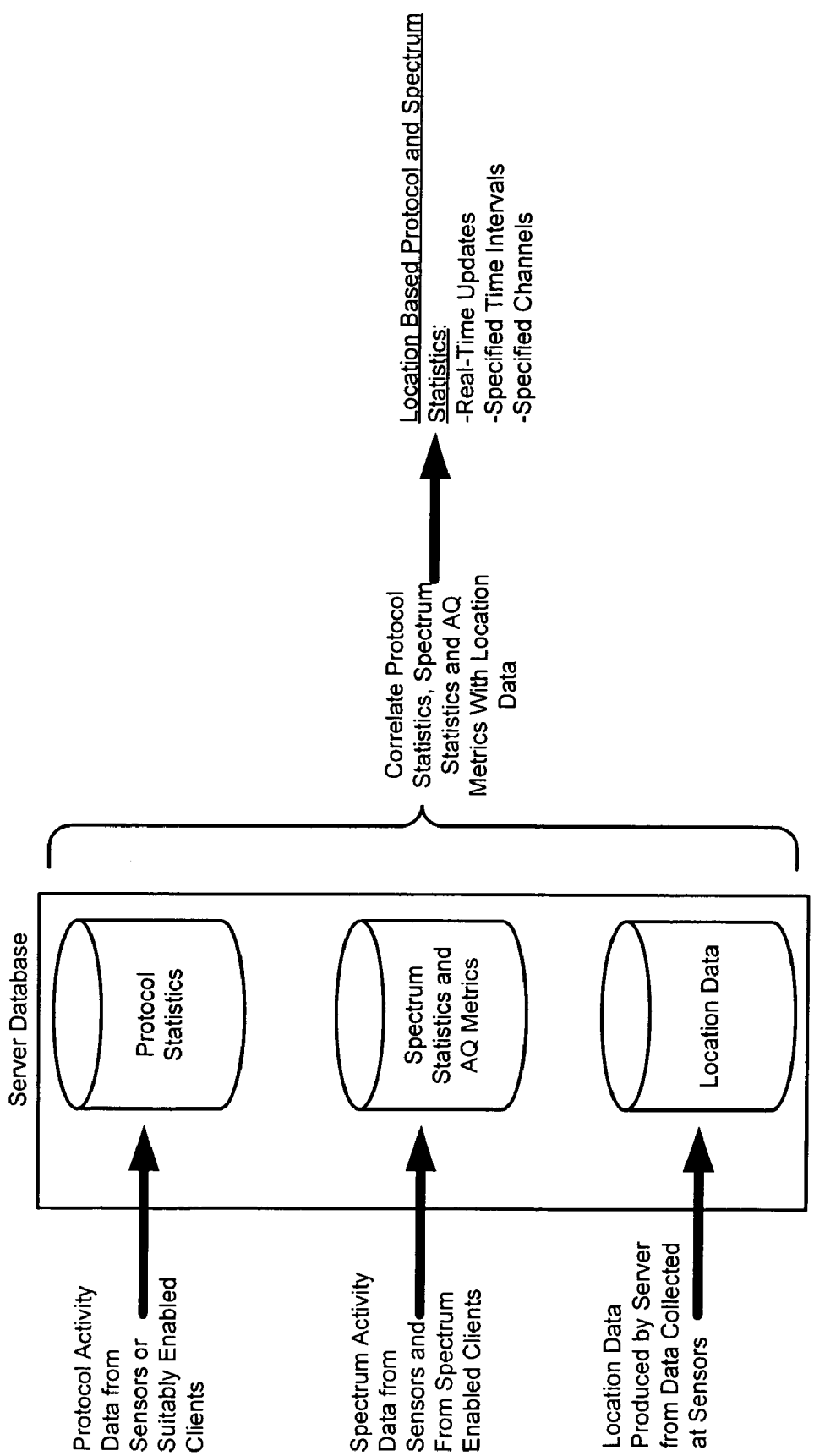
FIG. 4 is a flow diagram depicting how correlation is performed between location data and spectrum and protocol data for site survey purposes.

Another high level server service is a correlation engine 3150. The correlation engine 3150 correlates protocol data and/or spectrum data (and AQ metrics derived therefrom) with location. FIG. 4 generally illustrates how the correlation engine correlates protocol data and/or spectrum data (produced either by the sensors or by suitably enabled client stations) with location data pertaining to the sensing of the protocol data and/or spectrum data. Protocol data and spectrum data may be allocated to database fields managed by the server database application, and the correlation engine keeps track of the location of the spectrum-enabled client devices (which are in many cases move throughout a space) that supplied the spectrum and/or protocol data, or keeps track of the client devices that provoked the protocol data sensed by the sensors. The time of occurrence associated with detection of the spectrum, protocol and location data is also noted when stored in the database, and useful during correlation.

Figure 5:
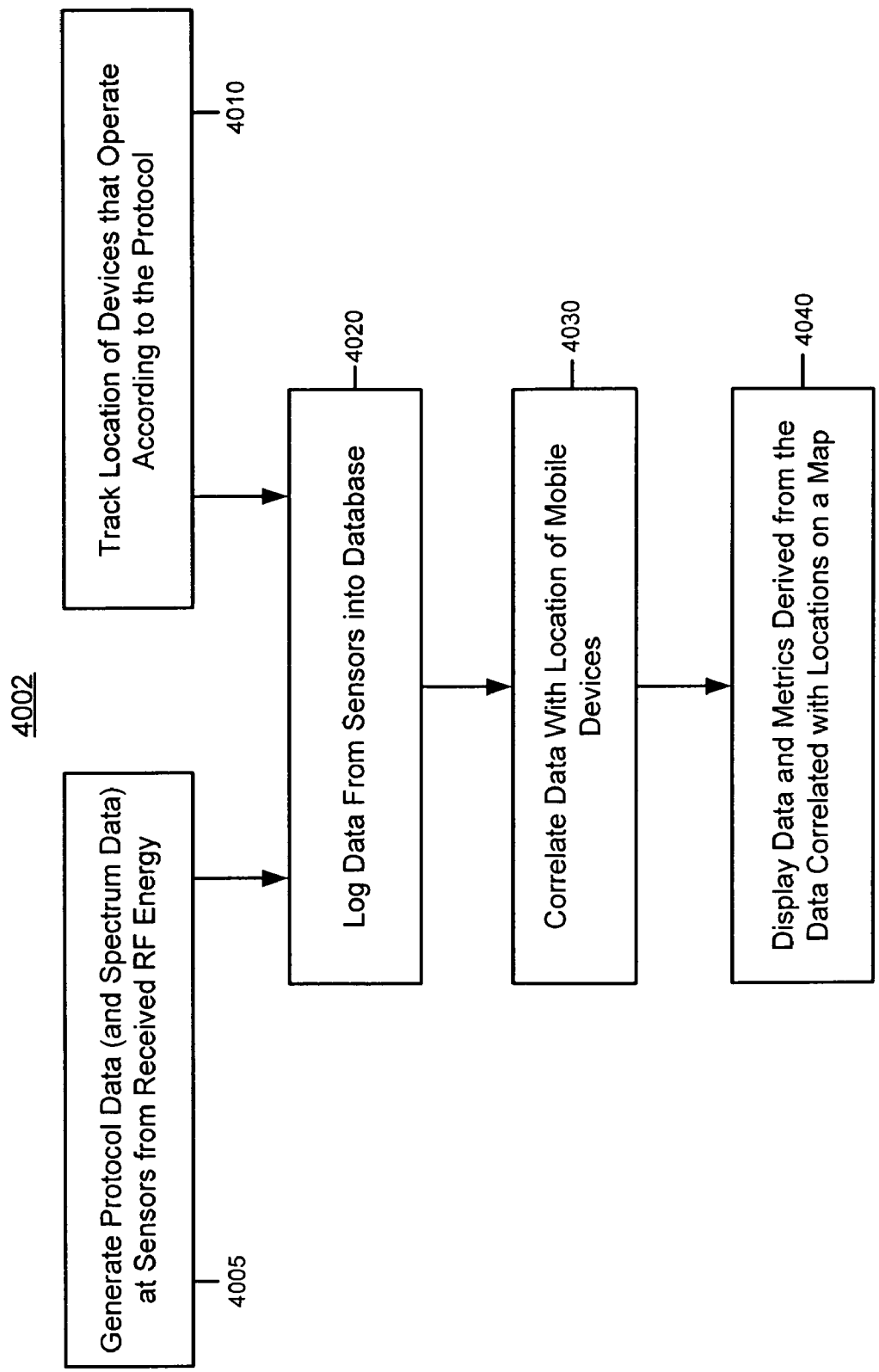
FIG. 5 is a flow diagram of one correlation technique.

Turning to FIG. 5, a first correlation scheme 4002 is shown for correlating location data with data gathered by one or more sensors. In this scheme, protocol data derived by the sensors is correlated with locations of one or more client (802.11) devices. The protocol data provoked by the client devices is captured by the traffic monitoring sections of the sensors, and meanwhile the server is also initiating location operations with the sensors to track the location of the client devices.

In step 4005, the sensors detect received RF energy, demodulate the energy and derived supply protocol data. The protocol data is described above, and from the protocol data, metrics may be produced (at the sensors or the server) that include the AQ statistics such as average 802.11 data rate, number of simultaneous different client stations detected, percentage of 802.11 retries, etc. This data is transferred from the sensors to the server and logged into the database in step 4020 in association with the time of occurrence. Packets from/to the client station whose location is being tracked may be noted as well to facilitate correlation of the corresponding protocol statistics with the location of that station. As noted in step 4005, it is also possible that spectrum data generated by the sensors (in association with the activity provoked by the client devices) may also be transferred to the server and logged into the database in step 4020.

In step 4010, the locations of the client stations are tracked. This is achieved by the server interacting with the sensors to perform the location operations described above. The server will store the location data in the database.

Steps 4005 and 4010 are performed continuously to update the locations of the client devices locations over time, together with new protocol and/or spectrum data. The data produced by steps 4005 and 4010 is logged into the database in step 4020.

In step 4030, the server correlates the protocol data received from the sensors with the location of the devices that provoked the protocol traffic activity in order to ascertain characteristics of the protocol traffic in the physical locations of the devices. In particular, protocol related metrics derived from the protocol data, such as average data rate, number of client stations and number of packet resends are correlated with the physical location of the client devices. As a result, protocol data characteristics and metrics may be displayed on a map correlated in space (and time) with the physical locations of the devices that provoked the protocol data as represented by step 4040. Similarly, in step 4030, spectrum data and related characteristics detected by one or more sensors may also be correlated (in time) with the position of the devices that provoked that data.

Figure 6:
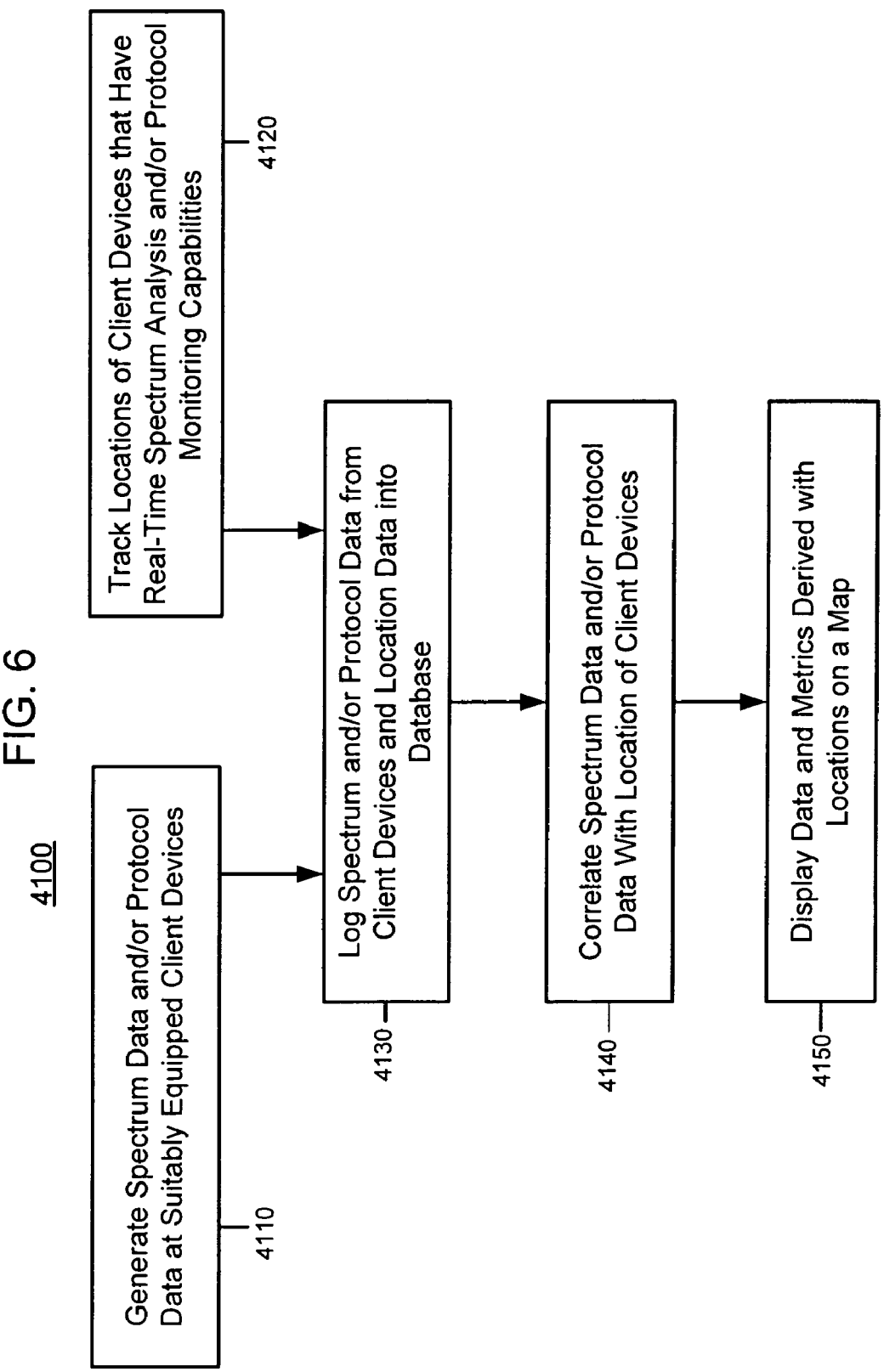
FIG. 6 is a flow diagram of a second correlation technique.

FIG. 6 illustrates another correlation scheme 4100 in which the devices that supply the spectrum and/or protocol data are client devices equipped with the capabilities described above in connection with FIGS. 2 and 3. In step 4110, the client devices detect received RF energy and produce spectrum data and/or protocol data. Meanwhile, in step 4120, the locations of the client devices are tracked by the sensors and server as explained above. Steps 4110 and 4120 are performed continuously such that the locations of the client devices are updated together with spectrum and/or protocol data. In step 4130, the client devices transfer the protocol and/or spectrum data that detect and produce to the server, by a wireless transmission via a WLAN AP (or sensor), for logging into a database, associated with time of occurrence. In step 4140, the server correlates the spectrum and/or protocol data received from the client devices with their locations (and time). And in step 4150, protocol data and/or spectrum data (and metrics derived therefrom) may be displayed on a map correlated with the physical locations of the client devices that collected it.

The correlation techniques described above in connection with FIGS. 5 and 6 are useful to automatically and dynamically provide a real-time site survey of a space where wireless radio activity is occurring. Correlating the protocol and/or spectrum data collected by the sensors or client devices with location allows for a visual display of information relevant to the performance of a wireless network, such as an 802.11 WLAN. In addition, the correlated data may be stored over time to allow for later playback of the correlated data for user-specified time intervals, with controls being provided by a graphical user interface to set a start time, play, pause, rewind, and fast-forward.

Figure 7:
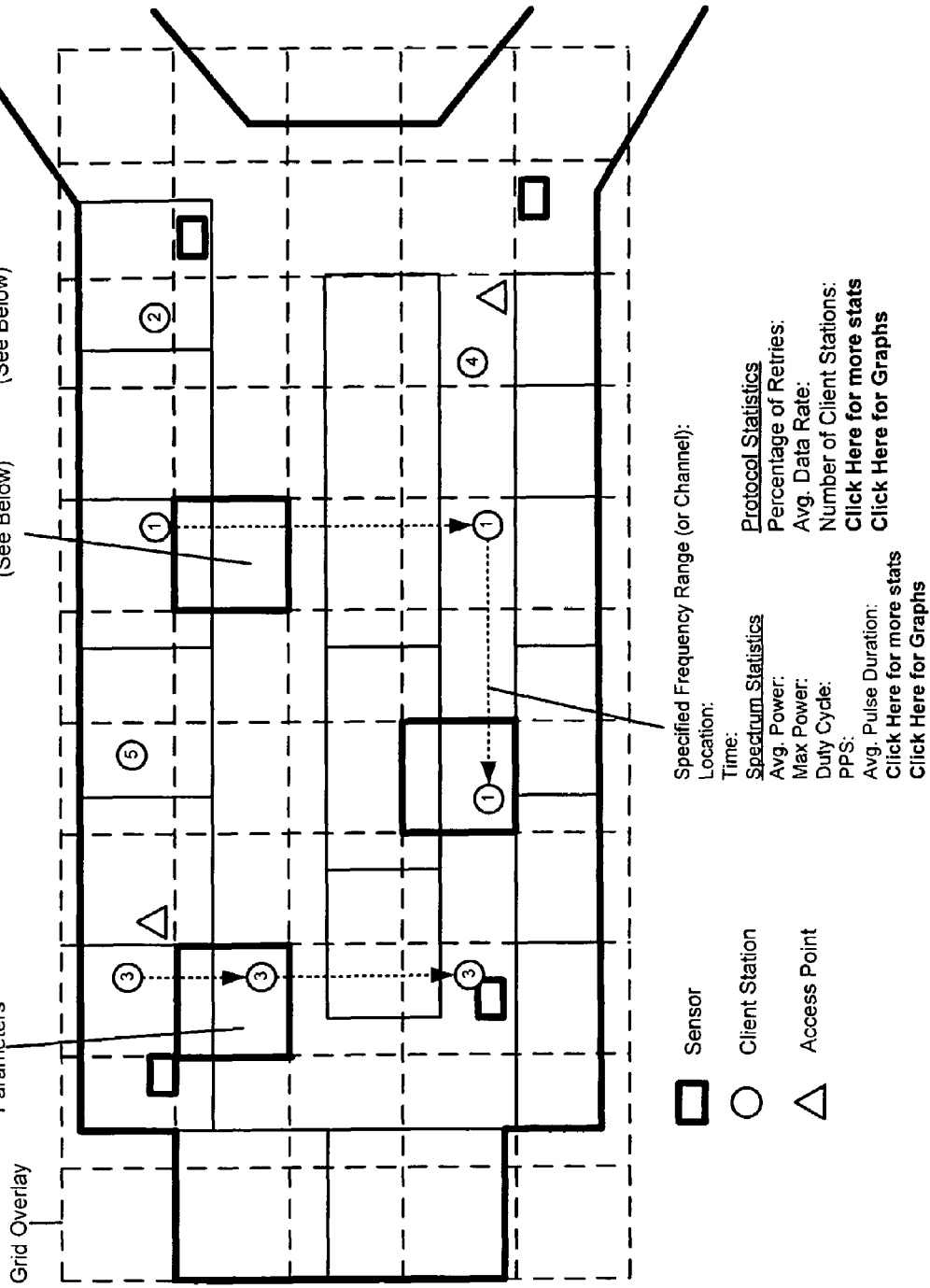
FIG. 7 is a diagram of a map onto which spectrum and/or protocol data may be displayed correlated with the location of the activity the provoked the spectrum and/or protocol data.

The types of spectrum and protocol data that may be detected and correlated with location are not limited to those associated with AQ metrics described above. Moreover, the spectrum and protocol data may be associated with one or more 802.11 channels, or the entire frequency band of interest, rather than a specified frequency range or channel. Examples of other types of spectrum data are: power (average or maximum) versus frequency (in a graphical plot for a sub-band, channel or entire band), number of non-WLAN (interferer) signals detected or classified, pulse histograms (pulse duration, pulse bandwidth, pulse center frequency, pulse gap histogram), or any other spectrum related data that can be derived from received radio frequency energy by one or more sensors, or one or more client devices. Protocol data may comprise any data that may be derived from protocol analysis performed on packets detected by one or more of the sensors or client devices. For example, protocol data may include per observed BSSID:

Channel
beacons, last beacon,
RSSI: min, max, avg, std-dev
SQI: min, max, avg, std-dev
TBTT: min, max, avg, std-dev
TSF: min, max, avg, std-dev
Mgmt Frames: Rx, Tx;

and per observed device-pair:

Channel
Addresses: Tx, Rx,
Pre-amble map
Rate map
Frame lengths: total, min, max,
RSSI: min, max, sum, sum-of-squares
SQI: min, max, sum, sum-of-squares
RTS
CTS
Acks
Retries
Data Frames
Management Frames
Fragments An example of how this data may be displayed against a map of a space is shown in FIG. 7, which is described in conjunction with FIG. 7. The solid lines in the map represent walls that delineate rooms, such as offices, from corridors, in a building. The dotted lines form a grid that overlays the map. By clicking in a cell in the grid, protocol and/or spectrum data may be displayed for that corresponding cell or for the closest cell for which data is available. Alternatively, data may be displayed anywhere along the movement path of a device, as shown for example, by client devices (1) and (3). While the space in FIG. 7 is shown as a two-dimensional space, it should be understood that it may be a three-dimensional space, such as a multi-story building, in which case the sensors are deployed on each of the floors of the building.

Figure 8:
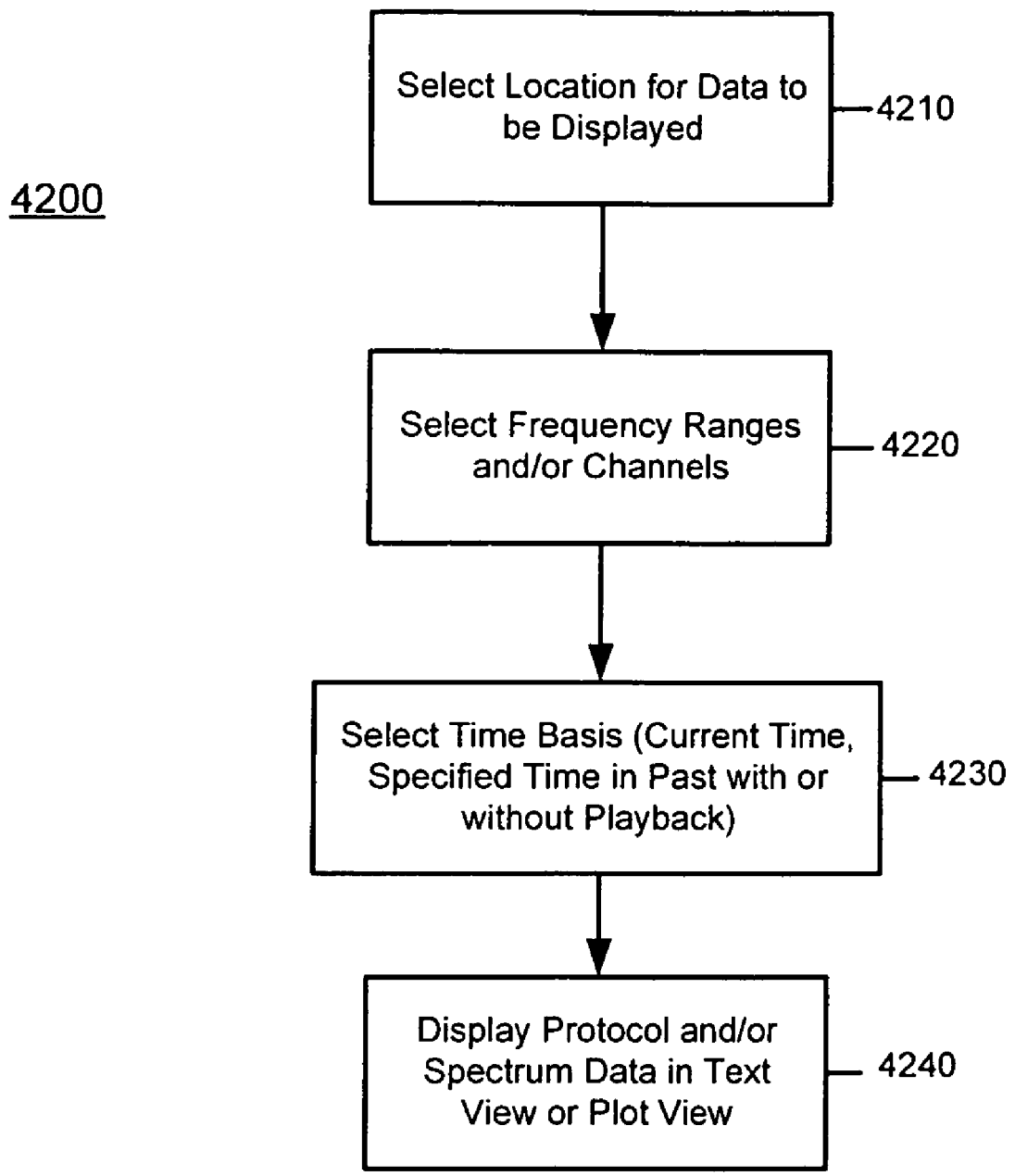
FIG. 8 is a flow chart depicting techniques for controlling the display of the spectrum and/or protocol data correlated with location.

Turning to FIG. 8, a process 4200 for controlling the display of the correlated information is shown. In step 4210, a location on a map is selected for display of correlated data (spectrum and/or protocol data). In step 4220, a frequency range and/or channel is selected for display of data. The entire band may be selected for display of data. In step 4230, a time basis is selected for display of data, such as current real-time data, or a specified time in the past with or without a playback feature. The playback feature of spectrum or protocol data is described more fully on co-pending and commonly assigned U.S. Application No. 60/556,513 filed Mar. 25, 2004, and entitled "User Interface and Display of Data in a Server and Multiple Sensor System that Monitors Activity in a Shared Radio Frequency Band." In step 4240, the protocol and/or spectrum data according to the parameters selected in the previous steps is displayed, in either a text view or a plot view.

Figure 9:
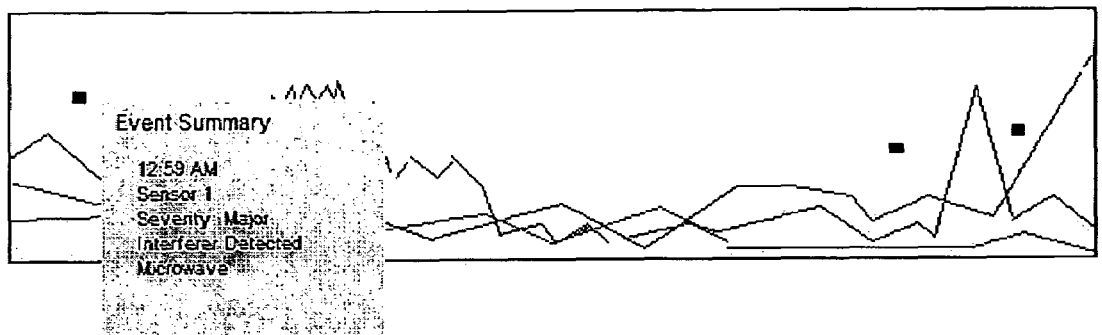
FIG. 9 is a diagram illustrating an exemplary graphical plot of spectrum or protocol data.
Figure 10:
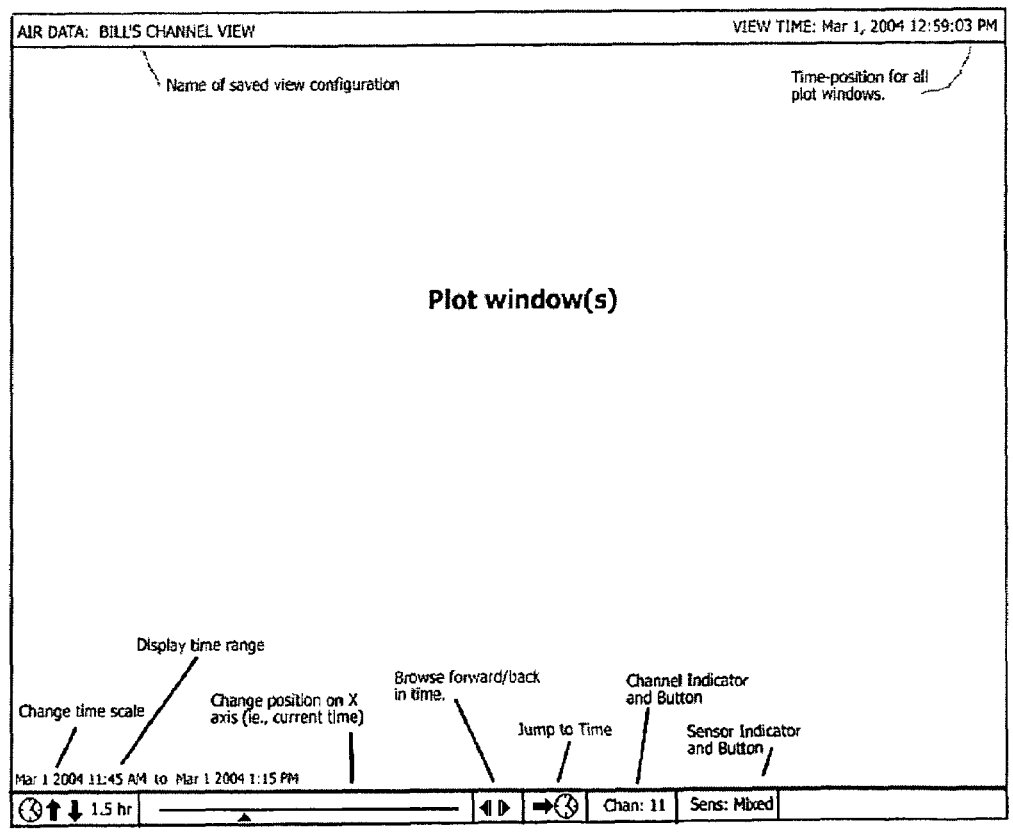
FIG. 10 is a diagram illustrating an exemplary display window in which spectrum or protocol data may be displayed in a time-shift mode.

FIG. 9 illustrates an example of the plots that may be displayed for a variety of AQ metrics associated with a particular location. FIG. 10 illustrates an example of a window in which data (protocol or spectrum) associated with a particular location may be plotted in a time-shift mode to allow for playback, fast forward, rewind, etc.

The low level services 3100 will now be described in more detail.

RF

The RF manager 3210 is responsible for aggregating and logging signal classification events from the classification engine 2720 in a sensor 2000, and for aggregating and logging spectrum statistics and raw spectrum information from the measurement engine 2710. The RF manager 3210 may also supply new or update existing classification templates or reference files to each sensor that the classification engine uses to classify RF signals.

Location

The location manager 3220 in the server handles the location processing to determine a location of a device operating in the frequency band. Location of a device (WLAN or interferer) can be a driving point for other analysis, particularly, security analysis. The location manager 3220 selects a group of sensors (e.g., 4 sensors) for a location measurement operation to locate a particular device. Each location operation usually needs several sensors working in concert. The location manager 3220 selects the subset sensors to be used in a location operation. An example of a location process using time difference of arrival techniques is disclosed in commonly assigned and co-pending U.S. application Ser. No. 10/409,563, filed Apr. 8, 2003 referred to above. An example of a RSS location process is described in commonly assigned and co-pending U.S. Provisional Application No. 60/582,317, filed Jun. 23, 2004, entitled "System and Method for Locating Radio Emitters Using Self-Calibrated Interpolated Path Loss Computation." The entirety of these prior applications is incorporated herein by reference. Many other TOA, TDOA, RSS and other location techniques are known in the art. The location manager 3220 dispatches location request messages to each of the sensors that are to be part of the location operation. Each sensor generates TDOA or RSS information with respect to their respective receipt of the signals from the target device to be located and sends this information in a message to the location manager 3220. The location manager 3220 performs the final calculations from the TDOA or RSS information to compute the location of the device that is the subject of the location request. The location manager 3220 may have a configurable retry policy for a failed location operation.

Protocol

The protocol manager 3230 in the server is responsible for logging the captured packets by the various sensors into a log file for later processing. There may be a time sync difference between sensors. Different sensors come up (power up) at different times and do not have a concrete time of day concept. They have a notion of ticks with respect to which the server software needs to normalize. For example, sensor 1's tick 30 may represent the same instance of time as sensor 2's tick number 1000. The protocol manager software accounts for such skews.

The protocol manager 3230 may also provide aggregate packet statistic streams to a requesting client application. The protocol manager 3230 synchronizes the packet arrival from different sensors into a common time line. That is, packets captured at the same time in two different sensors may reach the server at a certain time skew. The protocol manager 3230 ensures that this time skew does not affect the packet traces. The protocol manager 3230 also detects when multiple sensors may see the same packet and report it to the server and remove the duplicate packet.

A set of filters may be used to configure background and real-time filtering of packets (as well as configuring the size of the background log) and are executed by the protocol manager 3230.

In sum, a method is provided for monitoring wireless activity in a radio frequency band, comprising: receiving radio frequency energy at each of a plurality of known positions in a space; determining positions in the space of one or more devices emitting radio frequency energy in the space from the received radio frequency energy at the plurality of known positions; generating activity data representing characteristics of received radio frequency energy in the space; and correlating the activity data with the positions in the space that are associated with provocation of the activity data.

Similarly, a system is provided comprising: a plurality of sensor devices, each at a corresponding known position in a space, each sensor device receiving radio frequency energy at their corresponding known position; a computing device coupled to the plurality of sensor devices, wherein the computing device determines positions in the space of one or more devices emitting radio frequency energy in the space from the radio frequency energy received by the sensor devices at the known positions, and correlates the activity data representing characteristics of received radio frequency energy with positions in the space associated with provocation of the activity data.

Further, a method is provided for monitoring wireless activity in a radio frequency band, comprising computing positions in a space of one or more devices emitting radio frequency energy in the space from radio frequency energy received at a plurality of known positions; and correlating the activity data representing characteristics of received radio frequency energy in the space with positions in the space that are associated with provocation of the activity data.

The above description is intended by way of example only. What is claimed is:

1. A method for monitoring wireless activity in a radio frequency band, comprising:
   a. receiving radio frequency energy at each of a plurality of known positions in a space;
   b. determining positions in the space of one or more sources of the radio frequency energy from the received radio frequency energy at the plurality of known positions;
   c. generating statistics related to characteristics of the received radio frequency energy in the space over time, wherein generating comprises generating protocol statistics related to performance of communication occurring according to a communication protocol, the protocol statistics comprising average data rate, number of packet resends and number of devices operating according to the communication protocol, and wherein generating comprises generating spectrum statistics comprising average power, maximum power and duty cycle for received radio frequency energy in a frequency range;
   d. correlating the statistics with the positions in the space that are associated with provocation of the statistics, wherein correlating comprises correlating the protocol statistics derived from radio frequency energy detected from the one or more sources with the positions of the one or more sources; and
   e. displaying the protocol and spectrum statistics on a map at positions corresponding to where occurrence of the radio received radio frequency energy that led to the generation of the statistics.

2. The method of claim 1, and further comprising tracking movement of the one or more sources through the space.

3. The method of claim 2, wherein displaying comprises displaying the protocol and spectrum statistics along a movement path of a source.

4. The method of claim 1, wherein (e) displaying comprises selecting a position on a grid on said map to display activity data for that position or for a nearby position for which data is available.

5. The method of claim 1, and further comprising storing activity data correlated with location; and selecting a time basis for display of said activity data, wherein said time basis includes a current time or a specified time in the past.

6. The method of claim 5, and further comprising providing user interface commands for playback, fast forward and rewind of said activity data.

7. The method of claim 5, wherein displaying comprising displaying the activity data in a plot with respect to time.

8. A system comprising:
   a. a plurality of radio devices, each at a corresponding known position in a space, each radio device receiving radio frequency energy at its corresponding known position and generating protocol statistics related to performance of communication between one or more sources that communicate using a communication protocol, the protocol statistics describing data rate of packets transmitted, number of packet resends between sources and the number of sources communicating using the communication protocol, and wherein the radio devices further generate spectrum statistics describing power and duty cycle for received radio frequency energy in a given frequency range;
   b. a computing device coupled to the plurality of radio devices, wherein the computing device:
      i. determines positions in the space of one or more sources emitting radio frequency energy in the space from the radio frequency energy received by the radio devices at the known positions; and ii. correlates the protocol statistics and spectrum statistics received from the plurality of radio devices with positions in the space of the one or more sources; and iii. generates data for displaying the protocol and spectrum statistics on a map at positions in the space associated with the occurrence of the signals that led to generation of the protocol statistics and spectrum statistics.

9. The system of claim 8, wherein said computing device generates, in response to a user selection of a position on said map, display data for displaying the protocol statistics and spectrum statistics.

10. The system of claim 8, wherein the computing device generates display data for tracking movement of the one or more sources through the space.

11. The system of claim 10, wherein the computing device displays the protocol and spectrum statistics along a movement path of a source.

12. A method for monitoring wireless activity in a radio frequency band, comprising:

computing positions in a space of one or more devices emitting radio frequency energy in the space from radio frequency energy received at a plurality of known positions;

generating protocol statistics related to performance of communication between one or more devices that communicate using a communication protocol, the protocol statistics describing data rate of packets transmitted by the one or more devices, number of packet resends by the one or more devices and the number of devices communicating using the communication protocol, and generating spectrum statistics describing power and duty cycle for received radio frequency energy in a given frequency range;

correlating the protocol statistics and spectrum statistics with positions in the space of the devices which led to generation of the statistics; and displaying the statistics on a map at positions to indicate corresponding positions in the space of occurrence of the signals that led to generation of the protocol statistics and spectrum statistics.

13. The method of claim 12, wherein displaying comprises, in response to a user selection of a position on said map, displaying the statistics.

14. The method of claim 12, and further comprising tracking movement of the one or more devices through the space.

15. The method of claim 14, wherein displaying comprises displaying the protocol and spectrum statistics along a movement path of a device.

16. The method of claim 12, wherein displaying comprises selecting a position on a grid on said map to display activity data for that position or for a nearby position for which data is available.

17. The method of claim 12, and further comprising storing protocol and spectrum statistics correlated with location; and selecting a time basis for display of said statistics, wherein said time basis includes a current time or a specified time in the past.

18. The method of claim 17, and further comprising providing user interface commands for playback, fast forward and rewind of said protocol and spectrum statistics.

19. The method of claim 17, wherein displaying comprising displaying the protocol and spectrum statistics in a plot with respect to time.

* * * * *